UNITED STATES PATENT OFFICE.

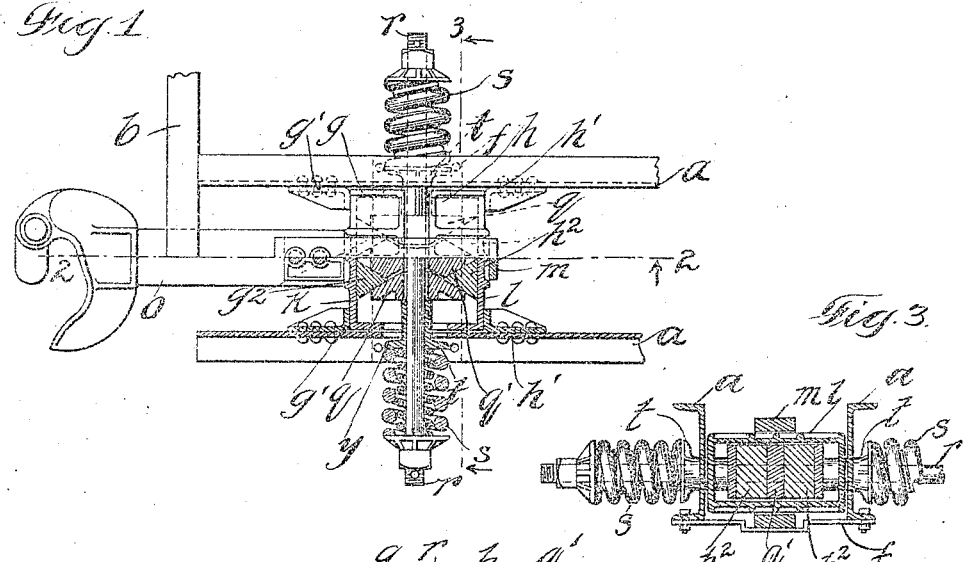

JAMES R. CARDWELL, OF CHICAGO, ILLINOIS.

DRAFT-GEAR.

No. 861,636.    Specification of Letters Patent.    Patented July 30, 1907.

Application filed January 17, 1906. Serial No. 296,576.

*To all whom it may concern:*

Be it known that I, JAMES R. CARDWELL, a citizen of the United States, residing at Chicago, in the county of Cook and State of Illinois, have invented a certain new and useful Improvement in Draft-Gear, of which the following is a full, clear, concise, and exact description, reference being had to the accompanying drawings, forming a part of this specification.

My invention relates to friction draft gear employed in railway service, and is of particular utility in connection with that class of friction draft gear employing follower plates and in which friction members extending longitudinally of the gear are interposed between the follower plates, and has for its object the provision of an improved construction whereby the relative movements of the follower plates may be limited by their direct interaction and independently of the said friction elements of the gear, whereby said friction elements are prevented from injuring the follower plates, and are themselves guarded from injury by the follower plates.

In the preferred embodiment of the invention the follower plates are pocketed and each contains a plurality of triangular friction blocks, the friction elements extending into the follower plates and there having coöperative relation with the triangular friction blocks in combination with spring mechanism adapted to resist the movements of the follower plates. The sides of the pocketed follower plates, preferably the top and bottom sides, are extended toward each other to such an extent that the follower plates meet before the friction elements have opportunity to contact with the vertical end walls of the follower plates. In the preferred embodiment of the invention, there are three longitudinally disposed friction elements that extend into the pockets of the follower plates, each of said friction elements being of rigid construction throughout, the said friction members being prevented from injuring the follower plates and being themselves guarded from injury by the follower plates, however, because of the novel construction of the follower plates above set forth. It is to be understood that the openings of the pockets of the follower plates face each other and that the end walls spoken of hitherto are at the ends of the gear.

While I desirably employ a plurality of longitudinally disposed friction members, I do not wish to be limited to the number of friction members employed.

The spring mechanism that enters into the preferred embodiment of my invention includes a rod extending transversely through the sills and through the longitudinally disposed friction elements and spring mechanism upon the exterior of the sills with which said rod coöperates.

I will explain my invention more fully by reference to the accompanying drawing, illustrating the preferred embodiment thereof, in which—

Figure 1 is a plan view, partially in section, of said embodiment. Fig. 2 is a sectional view on line 2 of Fig. 1. Fig. 3 is a sectional view on line 3 of Fig. 1. Figs. 4 and 5 are perspective views taken in different directions of one of the follower plates.

Like parts are indicated by similar characters of reference throughout the different figures.

The sills $a$ $a$ may be of any well known or suitable construction and may be united by any suitable means, a strut $b$ being partially indicated for the purpose of this union. A plate $f$ is disposed beneath and is attached to the sills, this plate being depressed at its central portion and raised on each side of the central portion. The openings of the pockets $q$ $h$ directly face each other. The vertical end walls $k$ $l$ of the follower plates are at the longitudinal ends of the friction gearing, the yoke $m$ surrounding the follower plates and engaging ribbed portions thereof, said yoke being attached to the shank $o$ of the coupler bar.

When a pull is exerted upon the coupler the follower plate $h$ remains in place with respect to the yoke, the two plates $g$ $h$ being moved relatively toward each other, as will appear. When a push is exerted upon the coupler the plate $g$ is maintained in position with respect to the coupler yoke with like results. The stops $g^1$ attached to the sills serve to engage the element $g$ to prevent longitudinal movements of said element when a pull is exerted upon the coupler. The stops $h^1$, also secured to the sills, engage the element $h$ to prevent the same from moving longitudinally when a push is exerted upon the coupler.

The pocketed follower plates $g$ $h$ carry elements $g^2$ $h^2$ that are preferably provided with friction surfaces that incline toward the center of the structure and which coöperate with correspondingly inclined surfaces provided upon the friction blocks $q$ $q$ that are designed to travel transversely of the sills. The elements $g^2$ $h^2$ are desirably loose with respect to the follower plates and are preferably triangular in plan, there being preferably two triangular blocks for each follower plate as indicated, in which case I desirably employ a supplemental friction block or member $q^1$ which is provided with inclined friction surfaces that engage the adjacent friction surfaces upon each set of triangular friction blocks. The friction blocks or members $q$ $q$ are provided with apertures extending transversely of the sills through the blocks, through which apertures the bolt $r$ is passed, which bolt is surrounded with coiled-springs $s$ $s$ that engage at their inner ends castings $t$ $t$ that are desirably separately formed with respect to the blocks $q$ $q$ for utility and convenience in assemblage and construction, the castings t t or block mechanism passing through holes in the sills into engagement with the blocks. It will be seen that the rod r and the springs s are placed transversely of the sills and that said springs act transversely of the sills.

When the member h is moved forward upon a sufficient pull upon the shank of the coupler and when the member g is moved rearwardly upon a sufficient push upon the shank of the coupler, the blocks q are moved apart against the force of the springs s s which are proportioned to offer the proper resistance to the relative motion between the elements g h for the purpose of the gearing, the springs s effecting the restoration of the parts to their normal positions when normal strain upon the shank of the coupler has been restored.

The top and bottom sides of the pocketed follower plates are desirably of equal length and extend inwardly a sufficient distance to prevent any of the longitudinally disposed elements $q$ $q$ $q^1$ from coming into contact with the vertical end walls of the elements g h, the combined lengths of the portions of the top walls projecting beyond the vertical end walls of the elements g h and also the combined lengths of similar portions of the bottom walls, exceeding the length of the elements $q$ $q$ $q^1$. In this way the combined clearance afforded between the rigid friction members and the follower plates is greater than the relative travel between the follower plates. By this construction not only is protection afforded to the follower plates and the friction members, but the structure may be made lighter as a consequence of the protection afforded. I do not wish to be limited to the presence of this clearance, however.

As indicated, the sills are provided with oblong recesses y, mid-way between the ends of which the bolt or rod r is normally disposed, the said rod and springs s being pushed or pulled longitudinally of the sills toward one end or the other of said slots, according to the direction of movement of the coupler yoke, the rate of travel of the rod and springs in the construction shown being approximately one-half of the rate of movement of the coupler yoke.

While I have herein shown and particularly described the preferred embodiment of my invention, I do not wish to be limited to the precise details of construction shown, but,

Having thus described my invention, I claim as new and desire to secure by Letters-Patent the following:

1. A friction draft gear including a rigid friction producing portion and pocketed follower plates having said portion interposed between the same and entering the pockets thereof, said follower plates being adapted for abutment against each other in operation of the gear, said friction producing portion including a rigid member having clearance with respect to the follower plates greater than the relative travel between the plates.

2. A friction draft gear including a rigid friction producing portion and pocketed follower plates having said portion interposed between the same and entering the pockets thereof, said follower plates being adapted for abutment against each other in operation of the gear, said friction producing portion having clearance with respect to the follower plates greater than the relative travel between the plates.

3. A friction draft gear including a rigid friction producing portion and pocketed follower plates having said portion interposed between the same and entering the pockets thereof, said follower plates being adapted for abutment against each other in operation of the gear.

4. A friction draft gear including pocketed follower plates, and a rigid friction producing portion interposed between and entering said pocketed follower plates, said friction producing portion including a rigid member extending between the follower plates and having clearance with respect to the follower plates greater than the relative travel between the follower plates.

5. A friction draft gear including pocketed follower plates, and a rigid friction producing portion entering the pockets of the follower plates, said friction producing portion having clearance with respect to the following plates greater than the relative travel between the plates.

In witness whereof, I hereunto subscribe my name this 15th day of January A. D., 1906.

JAMES R. CARDWELL.

Witnesses:
LEON STROH.
G. L. CRAGG.